United States Patent [19]

Kim

[11] Patent Number: 5,173,743
[45] Date of Patent: Dec. 22, 1992

[54] FIBER OPTICAL TIME-DIVISION-MULTIPLEXED UNBALANCED PULSED INTERFEROMETER WITH POLARIZATION FADING COMPENSATION

[75] Inventor: Byoung Y. Kim, Seoul, Rep. of Korea

[73] Assignee: Litton Systems, Inc., Woodland Hills, Calif.

[21] Appl. No.: 706,456

[22] Filed: May 28, 1991

[51] Int. Cl.⁵ .............................................. G01B 9/02
[52] U.S. Cl. .............................. 356/345; 250/227.19; 250/227.27
[58] Field of Search .................. 356/345, 351, 349; 250/227.19, 227.27

[56] References Cited

U.S. PATENT DOCUMENTS

| | | | |
|---|---|---|---|
| 4,632,551 | 12/1986 | Pavlath | 356/345 |
| 4,697,926 | 10/1987 | Youngquist et al. | 356/345 |
| 4,699,513 | 10/1987 | Brooks et al. | 356/345 |
| 4,770,535 | 9/1988 | Kim et al. | 356/345 |
| 4,932,783 | 6/1990 | Kersey et al. | 356/351 |

Primary Examiner—Samuel A. Turner
Assistant Examiner—Richard E. Kurtz, II
Attorney, Agent, or Firm—James F. Kirk; Harold E. Gillmann; Michael M. Carpenter

[57] ABSTRACT

Apparatus and methods for reducing and preventing polarization fading in unbalanced measuring interferometers. An extended interferometer having a plurality of sensors and a compensating interferometer are used. They are driven from a pulsed optical signal source wherein the optical signal comprises sequences of two pulses each. To prevent polarization fading the polarization of a predetermined one of each two-pulse sequence is switched, preferably orthogonally, from sequence to sequence. Interference pulse output groups are produced for each two-pulse driving sequence. Each output group has the same number of usable pulses as the number of sensors in the interferometer.

27 Claims, 3 Drawing Sheets

FIG. 1

PRIOR ART

FIBER OPTICAL TIME-DIVISION-MULTIPLEXED UNBALANCED PULSED INTERFEROMETER WITH POLARIZATION FADING COMPENSATION

BACKGROUND OF THE INVENTION

1. Field of the Invention

This invention pertains to the elimination of polarization fading in Unbalanced Fiber Optics Pulsed Measuring Interferometers. It is believed to be classified in Class 356/Subclass 345.

2. Definitions of Terms Used Herein

An Optical Interferometer is an interferometer that uses interference of light signals to produce other light signals carrying information.

A Fiber Optical Interferometer is an interferometer that carries light signals in an optical fiber.

A Measuring Interferometer is an interferometer that produces signals that are measures of pressure, temperature, sound waves or other physical parameters.

A Pulsed Interferometer is an interferometer driven by a pulsed signal.

A Multiplexed Interferometer is a number of interferometers which are interconnected and use a common optical source and/or optical detector.

Time Division Multiplexed Interferometer is an interferometer whose signals are time-multiplexed. That is, an interferometer whose signals are displaced in time. All of the interferometers mentioned herein are Time Division Multiplexed Interferometers.

An Unbalanced Interferometer is an interferometer wherein a light beam takes longer to travel the length of one interferometer branch than it does to travel the length of another interferometer branch. Usually the unbalance occurs because of the different lengths of the signal paths of the two branches.

A Compensating Interferometer is a two-branched Unbalanced Interferometer that has in one of its branches a predetermined time delay sufficient to produce two predetermined time-separated pulses.

A Polarization Controller is an apparatus that controls the polarization of the light signal travelling therethrough. In the state of the art it may, for example, be comprised of an electrode array positioned adjacent an optical fiber carrying a light signal.

A Phase Controller is an apparatus that controls the phase of the optical signal therethrough. Various apparatus may be used to modulate or vary the phase of the optical signal through predetermined phase angles.

A Pulse Sequence is a group of sequential pulses.

A Two-Pulse Sequence is a sequence of two pulses.

A Driving Group of pulses is a plurality of sequential spaced-apart Pulse Sequences that drive the input of a Measuring Interferometer. In the apparatus of the invention, a Driving Group from the Compensating Intereferometer has two two-pulse sequences.

A Ladder Network, for purposes of this specification, is a network of fiber optical elements. The sensing elements are serially positioned in the input fiber, and shunt optical fibers are positioned to shunt optical signals from the two ends of the string of sensing elements and from the junctions between the sensing elements to the output fiber.

A Measuring Pulse Group is a series of light pulses, containing sensed information, at the output fiber of a Measuring Interferometer.

Interference Visibility is the extent of the possible variation in output pulse amplitude caused by interference of two pulses in an interferometer.

Polarization Fading occurs when the polarizations of two concurrent pulses on the output fiber are orthogonal to each other, and the visibility is zero. When the two polarizations are identical, the two pulses interfere, and the visibility of the pulse produced from that interference is maximum. Between being identically and being orthogonally polarized, the pulse produced by the two interfering pulses has less than maximum visibility. The phenomenon of reduced visibility of a Measuring Interferometer, due to the Polarization Angle between concurrent pulses, is called Polarization Fading.

DESCRIPTION OF RELATED ART

This invention relates generally to apparatus and methods for reducing and preventing loss of information from polarization fading in Pulsed Unbalanced Measuring Interferometers such as those taught and shown, for example, in U.S. Pat. No. 4,770,535 that issued Sep. 13, 1988 to B.Y. Kim, et al for a "Distributed Sensor Array and Method Using a Pulsed Signal Source." The apparatus of the invention is an improvement on the apparatus of that patent. The apparatus of the claimed invention herein compensates for polarization drift in the apparatus, thereby much improving its performance.

Other examples of extended interferometer sensor arrays are described in the following United States patents.

1. U.S. Pat. No. 4,632,551 that issued Dec. 30, 1986 to George A. Pavlath for, "Passive Sampling Interferometric Sensor Arrays," and that is assigned to Litton Systems, Inc., the assignee of this application.

2. U.S. Pat. No. 4,697,926 that issued Oct. 6, 1987 to Robert C. Youngquist, et al for "Coherent Distributed Sensor and Method Using Short Coherence Length Sources," and that is assigned to The Board of Trustees of the Leland Stanford Junior University.

3. U.S. Pat. No. 4,699,513 that issued Oct. 13, 1987 to Janet L. brooks, et al for "Distributed Sensor and Method Using Coherence Multiplexing of Fiber-Optic Interferometric Sensors," and that is assigned to Stanford University.

4. The state of the art is further demonstrated by a letter entitled, "Technique for elimination of Polarisation Fading in Fibre Interferometers" by N.J. Frigo, A. Dandridge, and A.B. Tveten of the Naval Research Laboratory, Washington, D.C. 20875 that appeared in Electron Letters (GB), Volume 20, No. 8, 12 April 1984 at pages 319-320. The letter describes the use of three polarization filters having 120 degree spaced polarization axes that always have a polarized interference signal delivered through at least one of the three filters.

5. Using Diversity Receivers, to compensate for polarization fading is described by S. Neidlinger in "Electronics Letters" Vol. 26, No. 14, pages 1070-1072.

When light waves or optical signals are transmitted through a glass fiber, variations in tension in the fiber, temperature of the fiber, or other influences that changes the fiber in some manner, affect the phase of the optical signal traveling through the fiber.

In an Unbalanced Fiber Optical Pulsed Interferometer, a pulsed optical signal is delivered to two unbalanced fiber-optical signal paths. After traveling the two paths, the optical signals are merged into a common fiber.

In both the prior art apparatus and the apparatus of the invention, a Compensating Interferometer is designed to receive a pulse from a pulse source and to produce a two-pulse sequence from that single pulse. The duration of the received pulse is known, and the difference in path lengths of the two branches of the Compensating Interferometer is such that two spaced apart pulses, each having the same duration as the received pulse, are produced and transmitted to a Measuring Interferometer.

The Measuring interferometer is a fiber optical structure having an input and output optical fiber. The sensing and delay elements of the Measuring Interferometer may be in either input or output optical fiber, but they are described herein in the input optical fiber. Usually the sensing and delay elements are the same elements. Because of the similarity in shape to a ladder, the structure has been called a ladder network.

The time delays of the sensors in the Measuring Interferometer are matched to the timed spacing of the pulses of each driving Two-Pulse Sequence received from the Compensating Interferometer.

For example, in the three sensor Measuring Interferometer described in this specification, the first pulse of each two-pulse sequence is shunted through a first fiber-optical shunt into the output fiber. Although it is unusable it is the first pulse of the output pulse group.

The timing of the Measuring Interferometer sensors and fiber is such that the first received pulse travels through the first sensing element, across a second fiber optical shunt to the output fiber and arrives at the junction of the first fiber optical shunt and the output fiber concurrently with the arrival of the second received pulse through the first fiber optical shunt. The two concurrent signals interfere to produce the second pulse of the output pulse group. The second pulse carries information sensed by the first sensor.

Similarly, the timing is such that the first received pulse travels through the second sensing element, across a third fiber optical shunt to the output fiber and arrives at the junction of the second fiber optical shunt and the output fiber concurrently with the arrival of the second received pulse through the second fiber optical shunt to produce the third pulse of the output pulse group. The third pulse contains information sensed by the second sensor.

Likewise, the timing is such that the first received pulse travels through the third sensing element, across a fourth fiber optical shunt to the output fiber to arrive at the junction of the third fiber optical shunt and the output fiber concurrently with the arrival of the second received pulse through the third fiber optical shunt to form the fourth pulse of the output pulse group. The fourth pulse contains information sensed by the third sensor.

The second arriving pulse traverses the third sensor and returns by the fourth optical shunt to the output fiber to form the fifth pulse of the output pulse group. It interferes with no other pulse, and the fifth pulse contains no useful information.

Thus, for a Measuring Interferometer having "n" sensors in a Ladder Network, there are "n+1" fiber optical shunts, and "n+2" output pulses in the output pulse group on the output fiber. The first and the last pulses in the output pulse group are discarded.

The middle pulses of each of the output pulse group are distributed to the appropriate signals processors for each of the sensors.

The polarization of the source of optical signal sources is defined as a reference. In a Time-Multiplexed system of the configuration, for example, of U.S. Pat. No. 4,770,535, cited above, an optical signal source delivers periodic pulses to an Unbalanced Compensating Interferometer. The Compensating Interferometer delivers a sequence of two pulses for each signal pulse received from the source. The interval between pulses is designed to be the proper interval to cause the two driving pulses, when channeled through consecutive pairs of sensors, to produce superimposed interference pulses that have phases and frequencies that are measures of various physical parameters.

Consider a Measuring Interferometer that has only three sensors in a Ladder Network. Each sensor is a coil of optical fiber that is sensitive to some physical parameter that is to be measured. The three sensors are positioned on the input fiber to the interferometer. The interferometer has four shunt fibers for coupling optical signals into the output fiber. The shunt fibers are connected to couple the input of the first sensor, the junction between the first and second sensors, the junction between the second and third sensors, and the output of the third sensor to the output fiber. The spacing between driving pulses matches the identical time delays in each of the sensors.

When two pulsed light signals coincide, if their Polarizations are not the same, the amplitude of the pulse produced by their interference is not at its maximum visibility. If their Relative Polarizations are orthogonal, there is no visibility and no interference occurs, leaving the output pulse without any useful information. If their relative polarizations are the same, the visibility is maximum and the interference between the two pulses is maximum. If their relative polarizations are somewhere between being the same and being orthogonal, the visibility is greater than zero and less than the maximum possible.

When the polarizations are circular polarizations, if they are polarized in the same sense or direction, the polarizations of the two pulses are said to be the same. The pulses interfere fully, and the amplitude of the produced pulse depends completely upon the relative phase of the two interfering signals. The visibility is at its maximum. So, too, when the pulses are linearly polarized, if they are polarized in the same direction, or angle, the visibility is at its maximum, and the two pulses fully interfere.

When the pulses are circularly polarized, if the two pulses are polarized in opposite directions, and with the two potentially interfering pulses of equal amplitude, the visibility is zero, and the two pulses do not interfere to produce a useful signal pulse. So, too, when the pulses are linearly polarized, if the directions of polarization are orthogonal, the visibility is zero, and the two pulses do not interfere. The pulse remains at its maximum height and does not vary with the phase difference between the two pulses.

When the pulses are somewhere between being the same and being orthogonal, the visibility is somewhere between zero and maximum. A one hundred and eight degree phase difference between the pulses does not reduce the amplitude to zero as it would with full interference.

Without further calibration, because the visibility is not a priori known, it would not be possible to know what phase angle is represented by a certain reduction in amplitude of a particular pulse. To calibrate the phase difference between interfering optical signals, a known phase modulation is introduced into the pulses delivered to the measuring interferometer. The modulation signal is inserted at a particular modulation repetition rate or frequency so that the extend of its effect upon the amplitude of the output pulses may be measured.

Figure 1:
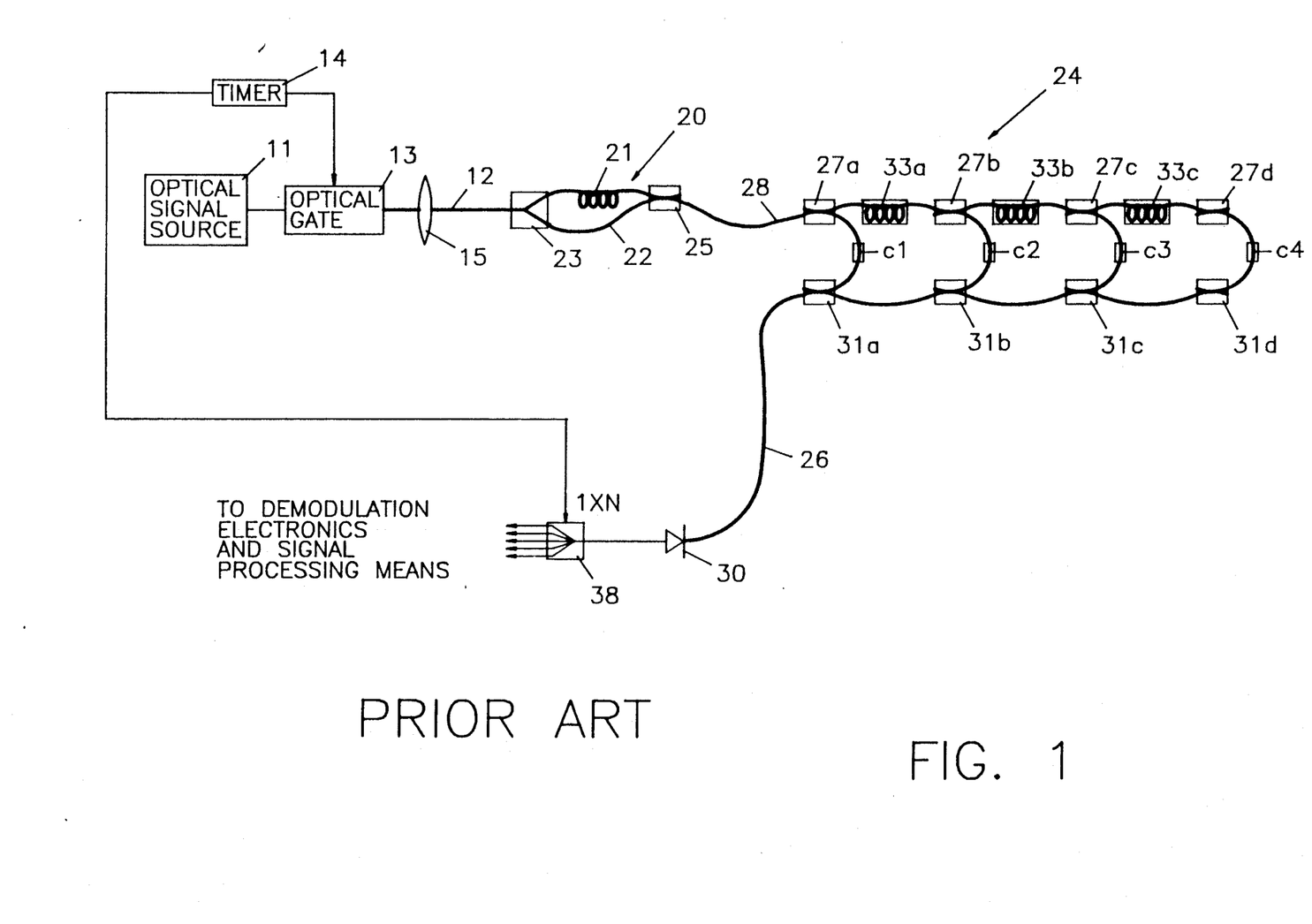
FIG. 1 is a schematic diagram of a prior art embodiment of an unbalanced pulsed fiber optic interferometer.

In the prior art of FIG. 1, to compensate for polarization fading, a polarization controller is inserted into each of the shunt fibers, and each controller is manually adjusted for maximum interference visibility in the output pulse group.

BRIEF DESCRIPTION OF THE INVENTION

It is convenient to discuss the invention in terms of three sensors producing five output pulses with three usable pulses. The first and last pulses are discarded.

Further, to simplify the explanation of the invention, it is convenient to assume that all of the pulses are linearly polarized. The apparatus operates similarly for circularly polarized pulses.

The pulses from the optical source are designated as having a polarization of zero. Pulsed Light Signal pulses are transmitted over a fiber to the input of the Compensating Interferometer. In one branch of the Compensating Interferometer, a polarization switch is inserted to switch the polarization of its received light into a polarization orthogonal to that of the source optical signal. The same apparatus is used to modulate the phase of the optical signal. To cause the polarization to be set relative to the polarization of the source, polarization preserving fibers are used to carry the light signals from the source into the Compensating Interferometer. It is then known that the relative polarizations of the light signal entering the two branches of the Compensating Interferometer are either the same or orthogonal.

Instead of manually adjusting the polarization of the light signal in the shunt fibers of the Measuring Interferometer as in the prior art, the apparatus of this invention alternates the polarization of one leg of the Compensating Interferometer relative to the polarization of the other leg, between being identical and being orthogonal.

Corresponding pulses in each output group are never both non-interfering. When a pulse in one group has a low interference visibility, the corresponding pulse in the next group has a high interference visibility. Thus, polarization fading is compensated by alternately switching the polarization in one branch of the Compensating Interferometer.

The pulses of the output pulse groups are distributed to their assigned signal processing circuits for each of the sensors.

It is convenient to describe a driving pulse group as two consecutive driving two-pulse sequences delivered by the Compensating Interferometer to the Measuring Interferometer.

The optical signal source produces periodic pulses that have an interval sufficiently great that the pulse trains from the Measuring Interferometer, produced by the two different driving two-pulse sequences of the driving group, do not interfere.

The polarization from the signal source is defined as zero. By using polarization conserving fibers to carry the source signal to the input of the Compensating Interferometer, the polarization of the light signals entering the Compensating Interferometer is also at a reference condition. The polarization of the light signal entering a predetermined one of the branches of the Compensating Interferometer is controlled, by a polarizer switch, to alternate between the input polarization and orthogonal polarization. That is, consecutive input pulses in that branch alternate between the two polarizations. Because the input pulse polarization is held to the reference polarization, the pulses in the latter branch alternate between identical and orthogonal polarizations.

The polarization of the driving two-pulse sequences from the compensating interferometer are not known. However, the polarization of a predetermined one of the two pulses alternates between two orthogonal polarization states. It must be understood that the choice of whether the first or the second pulse alternates in a two-pulse sequence is determined by the positioning of the polarization switch. It is assumed that the polarization switching is in the longer branch to switch the second pulse of each two-pulse driving sequence. The polarizations of an arbitarily chosen sequence of four consecutive driving pulses, comprising two two-pulse sequences, are A,B space A,B', where A and B are arbitrary, and B and B' are orthogonal.

The first pulse travels through the first shunt to form the first pulse of the group of output pulses. It also travels through the first sensor and the second shunt fiber to interfere with the second pulse traveling through the first shunt fiber to form the second output pulse in the output pulse group on the output fiber. The first pulse traveling through the second sensor interferes with the second pulse traveling through the second shunt fiber to form a third pulse of the output pulse group. The first pulse traveling through the third sensor and the fourth shunt fiber interferes with the second pulse traveling through the third shunt fiber to form a fourth pulse of the output pulse group. The second pulse traveling through the fourth sensor and fourth shunt fiber does not interfere with other signals and forms the fifth pulse of the output pulse group. Typical polarizations of two interfering pulses are C,D and C,D', where C and D are arbitrary, and D is orthogonal to D'.

Should the interfering signals polarizations be orthogonal, no interference visibility occurs in the corresponding output pulse. The switching of the polarization of one of the interfering pulses ensures that when the visibility is small in one interference pulse group, the visibility is large during the next output pulse group. A low visibility signal in one group ensures a corresponding high visibility in the next group, and a high pulse visibility in one group is followed by a low visibility pulse in the corresponding position in the next group.

The polarization switching of the fourth pulse of the two-pulse/two-pulse repetitive sequence can be implemented, for example, by an electro-optic integrated optics chip or by a Fiber-Optic birefringence modulator. Preferably such a modulator is used which also phase modulates the signal to determine the optical phase differences between interfering optical pulses.

A preferred implementation of the polarization switch uses a $LiNbO_3$ integrated optics chips in the compensating interferometer to provide both the polarization switching and phase modulation needed for demodulation and calibration of the sensor signals.

Preferably use a Fiber directional coupler or an integrated optic Y-branch on a chip in the Compensating Interferometer Y-branch. The chip is preferably connected to the optical source by a short section of polarization maintaining fiber, but the rest of the fibers in the array may be ordinary communication type fibers.

It is therefore an object of this invention to reduce polarization fading in an interferometer.

More particularly, it is an object of this invention to reduce polarization fading in an unbalanced pulsed fiber optics interferometer.

Other objects will become apparent from the following description, taken together with the accompanying drawings.

DETAILED DESCRIPTION OF THE PREFERRED EMBODIMENT

Figures 2, 2A:
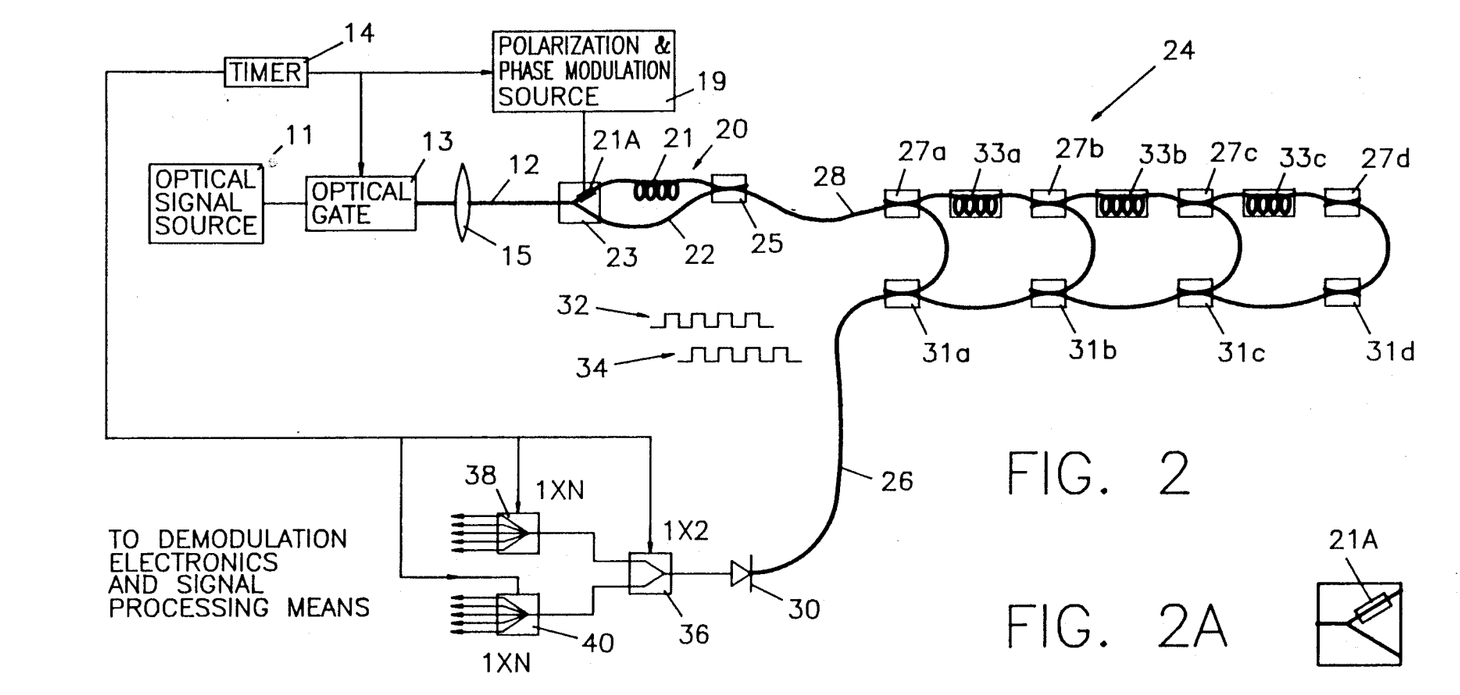
FIG. 2 is a schematic diagram of a preferred embodiment of this invention.
FIG. 2A is an expanded view of the fiber-optic Y and the polarization switch in a first branch of the Compensating Interferometer.

In the prior art embodiment of FIG. 1 and the embodiment of the invention of FIG. 2, a timer 14 controls an optical gate 13 to produce periodic pulses of optical signal from the optical signal source 11. Alternatively, the pulse delivering mechanism could be within the source itself. The optical signal is delivered from gate 13, through lens 15, into the optical fiber 12.

Figure 2B:
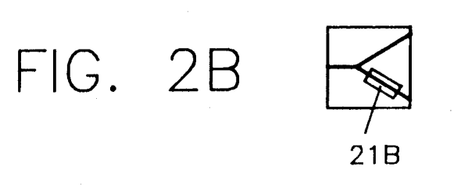
FIG. 2B is an expanded view of the fiber-optic Y and the polarization switch in a second branch of the Compensating Interferometer.

In the invention of FIG. 2, it is important to use a polarization maintaining fiber between the source and the unbalanced compensating interferometer 20 to cause the polarization orientation at the input to the unbalanced compensating interferometer 20 to be at the polarization orientation of the source so that the polarization switch 21A or 21B, depicted in FIGS. 2A and 2B respectively, switches the polarization of one of the two arms of the compensating interferometer between that reference polarization and its orthogonal polarization. By maintaining the polarization at the input to the unbalanced compensating interferometer 20 at the polarization of the source, it is ensured that the polarization angles of the two interference arms are truly either (1) identical or (2) orthogonal. The fiber 12 is a polarization preserving fiber. The remaining fibers are ordinary communication fibers that do not maintain the polarization of the optical signal.

The optical signal source may, for example, be a laser diode. It may be self pulsed, or it may be a continuous wave laser that is electronically or mechanically pulsed. In the shown embodiment, the light signal from the source 11 is pulsed by an optical gate controlled by a timer 14.

The unbalanced compensating interferometer 20 has a long arm 21 and a short arm 22. The optical signal, at its initial polarization, is split by the fiber-optical directional coupler or an integrated optical Y 23, and the arms are coupled together at their output end by fiber optical coupler 25. For each pulse received from gate 13, the compensating interferometer delivers a sequence of two pulses from coupler 25 to the input fiber of the Measuring Interferometer 24.

For convenience in describing the invention, the delivered pulses are described in groups of four pulses in two two-pulse sequences, and also the polarizations of each of the pulses are represented in linear polarizations even though they can be general.

The Measuring 24 Interferometer is shown in the form of a ladder network. For convenience, the Measuring Interferometer is shown and described with only three sensors 33a, 33b, 33c. The three sensors also have a predetermined time delay for the optical signal. The time delays of the sensors are substantially equal, and also equal to the time delay between the arms 21 and 22 of the unbalanced compensating interferometer 20. The shown Measuring Interferometer, with three sensors, has four fiber optical shunts, that are coupled, by couplers 27a, 27b, 27c, 27d, to the input fiber 28 and are coupled, by couplers 31a, 31b, 31c, 31d, to the output fiber 26.

The sensor and time delay elements 33a, 33b, 33c are positioned between the couplers 27a, 27b; 27b, 27c; and 27c, 27d on the input fiber 28. Alternatively, they could be positioned on the output fiber 26. They could also be split between the two fibers 28 and 26. The time delay of each sensor/time delay element 33 and the time delay of arm 21 are set substantially equal so that interference pulses are created at the couplers 31a, 31b, 31c, and they are delivered to the output fiber 26 of the Measuring Interferometer 24.

In the prior art embodiment of FIG. 1, the fiber 12 need not, and generally would not be, a polarization conserving fiber. Thus, if the polarization is zero degrees as it enters the fiber 12, it would be at some angle, P when it enters the splitter 23 at the input to the unbalanced compensating interferometer 20. The two pulses from the two arms 21, 22 merge at the coupler 25. The time delay between the two pulses is designed to equal the time delay between the path (a) through the sensor 33a, the second shunt, the coupler 31b, a segment of the output fiber 26 and (b) the path through the first shunt.

As the two pulses travel through the first shunt to the coupler 31a, their polarization angles would be unknown angles $A_o$ and $B_o$. The first pulse traveling through the sensor 33a and the second shunt and back to the coupler 31a would have an unknown polarization angle $A_1$. The two pulses with polarization angles $A_1$ and $B_o$ interfere at coupler 31a to produce a signal whose phase difference is a measure of the parameter sensed by sensor 33a. However, because of the differences in polarization between $A_1$ and $B_o$, a manually adjustable polarization adjuster c1 is inserted into the first shunt and manually controlled to create a maximum interference signal at coupler 31a.

Similarly, polarization adjusters c2, c3, c4 are adjusted to produce maximum visibility signals at couplers 31b, 31c, 31d. Unfortunately, tuning of one of the polarization adjusters affects the adjustment of the other adjusters, and they must be retuned until an optimum or a compromise occurs, whereby each of the three pulses produced on the output fiber 26 by the sensors 33a, 33b, 33c have sufficient visibility that they are usable.

The apparatus of the invention, however, shown in FIG. 2, has no polarization controllers in the shunts, and it automatically compensates for polarization fading by toggling the driving polarization of one of the pulses between a first polarization and its orthogonal polarization. The polarization of one of the two linearly polarized output pulses, for this example, from the Compensation Interferometer is toggled through an angle of ninety degrees.

Although either of the two pulses may be predeterminedly toggled, depending upon whether the polarization switch 21A or 22B is used, for convenience the switch 21A is chosen. The second of the two pulses of the two pulse output from the Compensating Interferometer is toggled to rotate its polarization ninety degrees on alternate pulse groups.

It is to be stressed that although the toggled polarization is recited as ninety degrees, and that is preferred, toggling of the polarization through any predetermined value produces improvement in polarization fading correction.

The output fiber 26 is coupled to the detector 30 that converts the optical signals into electrical signals. A 1×2 switch 36 is connected to receive the signals from the detector 30. The timer 14 delivers a timing signal to the switch 36 to cause incoming pulses to be distributed alternately to 1×n switches 38 and 40. The timer 14 sends timing signals to the couplers 38 and 40 to cause them to switch consecutively from one output to the next.

The splitter 23 may be a lithium niobiate chip coupler that is connected to be controlled by the polarization modulation source 19 to toggle the polarization orientation of the second pulses of the output pulse sequences at the coupler 25. Thus, the polarization angles of the first pulses of the two-pulse sequences in a driving linearly polarized pulse group are substantially parallel, and the polarization angles of the second pulse of the second two-pulse sequence in each four pulse driving group are orthogonal. That is, in each driving two-pulse/two-pulse group, the polarization orientations are preferably A-B-interval-A-B', where the orientations A and B are arbitrary, and B is orthogonal to B'. That orientation is also effective for circularly polarized optical signal pulses.

The timer is set so that all pulses produced by interference produced by one two-pulse sequence of driving pulses of a driving pulse group are channeled into switch 38. All pulses produced by the next sequence of driving pulses of a driving pulse group are channeled into switch 40. The output pulses are then alternately channeled, by groups of pulses into switches 38 and 40.

In each of the switches 38 and 40, the timer causes the input signals to such switch to be channeled consecutively to n output terminals and thence to corresponding input terminals of the demodulation electronics and signal processing means (not shown).

When it is desired to toggle the polarization of the second pulse in a two-pulse sequence, the polarization modulation source 19 is coupled to the polarization switch 21A of the longer arm 21 of the compensating interferometer 20. When it is desired to toggle the polarization of the first pulse in a two-pulse sequence, the polarization modulation source 19 is coupled to the polarization switch 21B of the shorter arm 22 of the compensating interferometer 20. The timer 14 controls the modulation source 19 so that a predetermined one of the two pulses of a driving pulse sequence has a polarization that is toggled in consecutive sequences.

To demonstrate the operation of the invention, the polarization of the second pulse of each two pulse sequence of each driving pulse group is chosen as the one to have its polarization toggled.

FIGS. 3A through 3E are shown to instruct in the operation of the invented apparatus. Typical polarization orientations of the pulses, for linearly polarized pulses, are shown by the arrows.

Figure 3A:
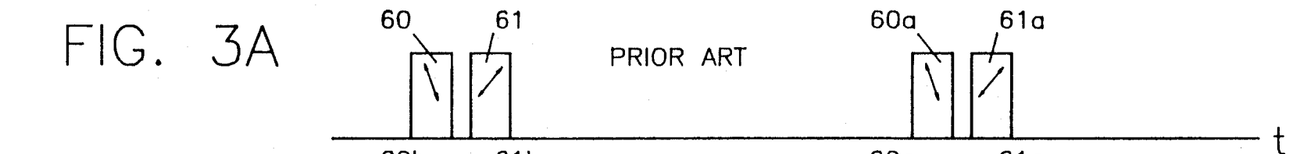
FIG. 3A is a graph of a prior art two-pulse/two-pulse linearly polarized driving signal group.

FIG. 3A shows a typical pulse sequence from the compensating interferometer 20 of a prior art apparatus of FIG. 1. Two-pulsed sequences of driving pulses are shown, in a two-pulse/two-pulse group 60–61 and 60a–61a, for comparison to the operation of the invention.

Figure 3B:
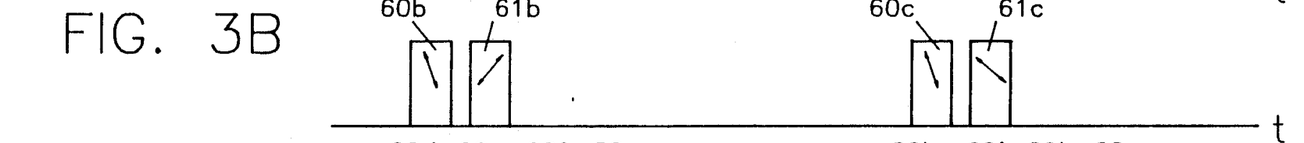
FIG. 3B is a graph of a two-pulse/two-pulse linearly polarized driving signal group according to this invention, showing the switching of the second pulse of each two-pulse sequence..

In the apparatus of the invention, with the fourth pulse chosen for polarization switching, typical pulse sequences from the compensating interferometer 20, for ninety degree polarization switching are substantially as shown in FIG. 3B. The actual polarization orientations are not known, and the shown orientations are chosen to demonstrate the invention. The apparatus is designed so that the polarization of the second pulse of each two-pulse driving sequence alternates, preferably through ninety degrees. Note that the polarization of pulse 61c, as shown by the arrows, alternates ninety degrees from that shown for pulse 61c, to that shown in 61b and then back to that shown for 61c, thence alternating ad infinitum. The polarization orientations of the pulses 61b and 61c of the two-pulse/two-pulse group are shown with orthogonal polarization orientations.

Figure 3C:
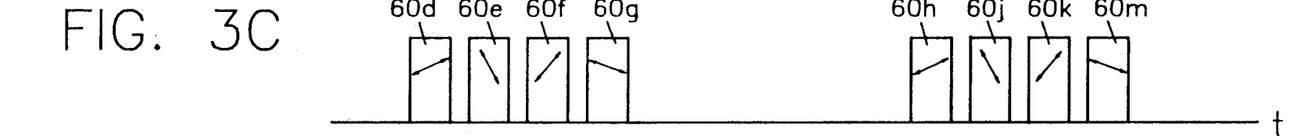
FIG. 3C is a graph of the interfering pulses delivered to the output fiber by the first pulses of the two-pulse sequences of FIG. 3B, showing typical polarization directions.

FIG. 3C shows typical polarization orientations of pulse trains produced by pulses 60b and 60c on fiber 26 at couplers 31a, 31a via sensor 33a, 31a via sensor 33b, 31a via sensor 33c. The individual pulses are polarized variously in unknown orientations, and the shown orientations are arbitrarily chosen to explain the invention.

Figure 3D:
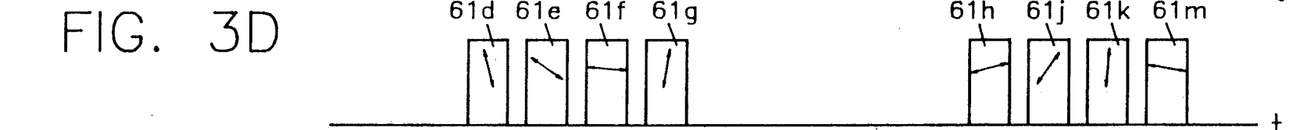
FIG. 3D is a graph of the interfering pulses delivered to the output fiber by the second pulses of the two-pulse sequences of FIG. 3B, showing typical switched polarization orientation.

Because pulse 61c has a polarization orientation substantially orthogonal to that of pulse 61b, the produced pulses 61h, 61j, 61k, 61m are also orthogonally polarized relative to the pulses 61d, 61e, 61f and 61g as shown in FIG. 3D. The pulses 61d . . . 61m are one pulse interval later than pulses 60d . . . 60m.

Figure 3E:
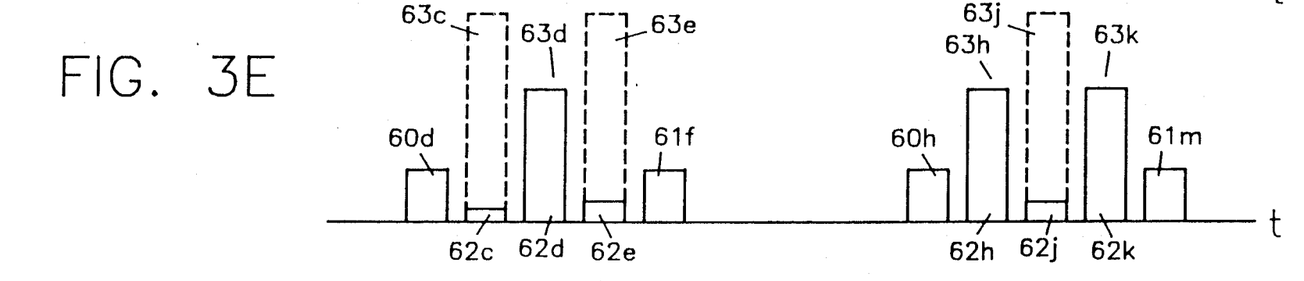
FIG. 3E is a graph of the output optical pulse trains produced by interference between the pulses of FIGS. 3C and 3D, showing the range of visibilities, in dashed lines, corresponding to the particular relative polarization orientations of FIGS. 3C and 3D.

The point of the invention is shown by the output pulse groups of FIG. 3E. The dotted portions of the pulses show the maximum height of the pulse determined by the optical phase difference between the pulses corresponding to the shown relative polarization orientations of aligned pulses from FIG. 3C and 3D.

When the pulses interfere, the coincident pulses 60e–61d, 60f–61e, and 60g–61f produce the pulses 62c, 62d, 62e in FIG. 3E. Similary, the coincident pulses 60j–61h, 60k–61j, and 60m–61k produce the pulses 62h, 62j, 62k. Note that where the polarization orientations of the coincident pulses are substantially orthogonal, the visibility of the interfering signal is substantially zero. Although the amplitude of the pulse is large, the variation of that amplitude due to signal interference, or the visibility, is substantially zero. The variation of the amplitude, or the visibility, is shown by the dotted portions 63c, 63d, 63e, 63h, 63j, 63k of the pulses 62c, 62d, 62e, 62h, 62j, 62k. The signals of the pulse groups of FIG. 3E complement each other so that when signals 62c, 62e, 62j, having large visibilities of the interference signals, appear in one interference pulse group, corresponding signals 62h, 62k, 62d, having small visibilities of the interference signals, appear in the other interference pulse group. In FIG. 3E, the pulses 60d, 61f, 60h, 61m are useless.

Thus, only the pulses 62c, 62d, 62e, 62h, 62j, 62k are used by the Signal Processing Means. The signals sent to the demodulation electronics and signal processing means (not shown) are delivered from switch 38. Because the switch is hard-wired, the correct pulse proceeds to the correct address in the signal processing means.

Thus, while the prior art interferometer apparatus experiences polarization fading, the improved apparatus of this invention does not.

Although the invention has been described above, it is not intended to limit the invention to the specific apparatus described, but only according to the spirit and scope of the appended claims.

I claim:

1. A fiber optics pulsed interferometer comprising:
   a source of pulsed optical signals periodically delivering periodic polarized optical pulses; and,
   an unbalanced fiber optic compensating interferometer for producing timed two-pulse sequences in which a predetermined one of said two pulses alternates its polarization orientation from sequence to sequence, said unbalanced fiber optics compensating interferometer including;
   a long arm and a short arm;
   means responsive to said periodic polarized optical pulses for splitting each periodic polarized optical pulse to provide optical signals to said long and short arm, and for switching the polarization of said optical signals in at least one of said arms, the optical signals passing through said arms and being combined in a coupler to deliver a separated two-pulse sequence, the polarizations of a predetermined one of the individual pulses in each two-pulse sequence alternating from sequence to sequence.

2. A pulsed interferometer as recited in which said predetermined one of said two pulses alternates its polarization from being the same polarization and being orthogonal thereto.

3. A pulsed interferometer as recited in claim 2 in which said predetermined one of said two pulses is the first pulse.

4. A pulsed interferometer as recited in claim 2 in which said predetermined one of said two pulses is the second pulse.

5. A pulsed interferometer as recited in claim 1 in which said predetermined one of said two pulses is the first pulse.

6. A pulsed interferometer as recited in claim 1 in which said predetermined one of said two pulses is the second pulse.

7. In combination:
   a first measuring unbalanced fiber optic interferometer having a plurality of fiber optics sensors in a ladder network said sensors having a predetermined time delay for optical signals;
   said sensors being in at least one of the serial input and output fibers of said ladder network, and a plurality of shunt fibers optically connecting said input and output fibers of said measuring interferometer;
   a source of pulsed optical signals;
   a compensating second unbalanced fiber optic interferometer having two arms of different optical lengths, the difference in optical length between such arms being substantially equal to the time delay in one of said sensors, to cause said interferometer to produce sequences of two optical signal pulses for each optical signal pulse it receives,
   a detector for converting optical signals into electrical signals, coupled to receive output signals from said first interferometer;
   a polarization switching means, coupled into a predetermined one of the arms of said second interferometer to switch the polarization orientation of a predetermined one of the pulses of said two-pulse sequences produced by said predetermined arm;
   and a timer, connected to said optical signal source to synchronize pulses delivered from said optical source to said second interferometer, and connected to said polarization switching means to continually toggle the polarization orientation of said predetermined pulses between two polarization orientations consecutively from sequence to sequence.

8. Apparatus as recited in claim 7 in which there are n sensors and n+1 shunt fibers, said sensors being serially connected in the input fiber of said ladder network, said shunt fibers being connected between said output fiber and the input end of said input fiber, the far end of said input fiber, and the junctions between said sensors.

9. The apparatus as recited in claim 8 in which said polarization switching means is positioned in the longer arm of said compensating interferometer, and said predetermined pulse of each said sequence is the second pulse.

10. The apparatus as recited in claim 8 in which said polarization switching means is positioned in the shorter arm of said compensating interferometer, and said predetermined pulse of each said sequence is the first pulse.

11. The apparatus as recited in claim 7 in which said polarization switching means is positioned in the longer arm of said compensating interferometer, and said predetermined pulse of each said sequence is the second pulse.

12. The apparatus as recited in claim 7 in which said polarization switching means is positioned in the shorter arm of said compensating interferometer, and said predetermined pulse of each said sequence is the first pulse.

13. Apparatus as recited in claim 7 in which said pulses are linearly polarized, and the polarization orientation difference between said two pulses from said Compensating Interferometer is more than zero degrees.

14. Apparatus as recited in claim 13 in which said polarization difference is substantially ninety degrees.

15. Apparatus as recited in claim 7 in which said pulses are substantially circularly polarized in different directions.

16. Apparatus as recited in claim 15 in which said consecutive pulses from said Compensating Interferometer are substantially equal in amplitude.

17. Apparatus as recited in claim 7 in which said pulses are further phase modulated in said Compensating Interferometer.

18. Apparatus as recited in claim 17 wherein said sensors are environmental sensors.

19. An apparatus for remotely sensing environmental effects without polarization signal fading, comprising:
a source of pulsed optical signals periodically delivering polarized optical pulses;
an unbalanced fiber optics compensating interferometer, including means for switching the polarization of optical signals in one of its arms, coupled to receive said periodic pulses and to deliver separated two-pulse sequences, the polarizations of a predetermined one of the individual pulses of each pair of pulses alternating from sequence to sequence;
an unbalanced measuring second fiber optics interferometer including environmentally sensitive elements, coupled to receive on its input fiber said alternating sequences of pulses from said first interferometer, producing output groups of optical interference pulses on its output fiber, one group for each of its said input sequences, the interference visibilities of the pulses of said output groups alternating between two sets of values from group to group; and
signal processing means, including means for converting said output groups of optical interference pulses into electrical signals, and including means for processing interference pulse signals of consecutive ones of said output groups to produce signals that are measures of the environmental parameters sensed by said sensors.

20. Apparatus as recited in claim 19 in which said polarizations are linear and said means for switching polarization switches said polarization by substantially ninety degrees.

21. Apparatus as recited in claim 20 in which said means for switching polarization is in the shorter arm of said compensating interferometer, and said predetermined pulse is the first said pulse of each sequence.

22. Apparatus as recited in claim 20 in which said means for switching polarization is in the longer arm of said compensating interferometer, and said predetermined pulse is the second said pulse of each sequence.

23. An apparatus for remotely sensing environmental effects as defined in claim 20, wherein said source of pulsed optical signals comprises a short coherence length light source.

24. Apparatus as recited in claim 19 in which said means for switching polarization is in the shorter arm of said compensating interferometer, and said predetermined pulse is the first said pulse of each sequence.

25. Apparatus as recited in claim 19 in which said means for switching polarization is in the longer arm of said compensating interferometer, and said predetermined pulse is the second said pulse of each sequence.

26. Apparatus as recited in claim 19 in which said measuring interferometer comprises:
input and output fibers, n sensors and n+1 shunt fibers, said sensors being serially connected in the input fiber of said ladder network, said shunt fibers being connected between said output fiber and the input end of said input fiber, the far end of said input fiber, and the junctions between said sensors.

27. An apparatus for remotely sensing environmental effects as defined in claim 19, wherein said source of pulsed optical signals comprises a short coherence length light source.

* * * * *